United States Patent

[11] 3,626,212

[72] Inventor Fumio Watase
Tokyo, Japan
[21] Appl. No. 676,178
[22] Filed Oct. 18, 1967
[45] Patented Dec. 7, 1971
[73] Assignee Tohoku Oki Electric Company
[32] Priorities Oct. 14, 1966
[33] Japan
[31] 41/70094;
Jan. 12, 1967, Japan, No. 42/3149

[54] PULSE GENERATING CIRCUIT
1 Claim, 14 Drawing Figs.

[52] U.S. Cl. .......... 307/275, 307/273, 331/112, 331/113, 331/176
[51] Int. Cl. .......... H03k 3/30
[50] Field of Search .......... 307/273, 275; 331/112, 113, 176

[56] References Cited
UNITED STATES PATENTS

| | | | |
|---|---|---|---|
| 2,230,216 | 1/1941 | Boers | 331/176 |
| 2,945,190 | 7/1960 | Mattson | 331/176 X |
| 3,178,658 | 4/1965 | Henrion | 331/113 X |
| 3,194,977 | 7/1965 | Anzalone et al. | 307/273 X |
| 3,239,778 | 3/1966 | Rywak | 331/176 X |
| 3,294,982 | 12/1966 | Russo | 307/310 X |
| 3,320,551 | 5/1967 | Miller | 307/273 X |
| 3,336,537 | 8/1967 | Reich | 331/116 |
| 3,502,912 | 3/1970 | McAvoy | 307/273 |

*Primary Examiner*—Donald D. Forrer
*Assistant Examiner*—R. C. Woodbridge
*Attorney*—Robert D. Flynn ABSTRACT: A pulse generating circuit such as a monostable multivibrator, an astable multivibrator and a blocking oscillator is comprised by a first and second transistors, a source of current energizing collector electrodes of transistors and a temperature sensitive element serially connected with the collector resistors and the difference between the voltage drop across the temperature sensitive element response to the variation in the ambient temperature and the source voltage is applied to the base and collector resistors.

PULSE GENERATING CIRCUIT

This invention relates to pulse generating circuits and more particularly to improvements relating to monostable multivibrators, nonstable multivibrators and blocking oscillators. In as much as the self-running period of conventional astable multivibrators, astable multivibrators and blocking oscillators varies dependent upon the variations in the source voltage and variations of ambient temperatures it is impossible to produce pulses of accurate waveform. Further when these devices are employed as frequency dividers it has been impossible to provide a large ratio of frequency division.

One object of this invention is to provide a new and novel pulse generating circuit which is not affected by the variations in the source voltage and ambient temperature by mere incorporation of a simple circuit element.

Another object of this invention is to provide a temperature compensated monostable multivibrator capable of operating independently of the variation in the ambient temperature by a unique utilization of a temperature sensitive element.

Still another object of this invention is to provide a novel temperature compensated astable multivibrator capable of operating independently of the variation in the ambient temperature by a unique utilization of a temperature responsive element.

A further object of this invention is to provide a novel voltage and temperature compensated monostable multivibrator capable of operating independently of the variation in the source voltage and ambient temperature by a unique utilization of an element whose current-voltage characteristic varies exponentially.

A further object of this invention is to provide a novel voltage and temperature compensated astable multivibrator capable of operating independently of the variation of the source voltage and ambient temperature by a unique utilization of an element whose current-voltage characteristic varies exponentially.

Still a further object of this invention is to provide a novel voltage and temperature compensated blocking oscillator capable of operating independently of the variation in the source voltage and ambient temperature by a unique utilization of an element whose current voltage characteristic varies exponentially.

Yet another object of this invention is to provide an efficient voltage and temperature compensated monostable multivibrator, nonstable multivibrator or a blocking oscillator by utilizing a temperature sensitive element and an element having an exponential current-voltage characteristic.

Further objects and advantages of the present invention will become apparent and this invention will be better understood from the following description, reference being made to the accompanying drawing. The features of novelty which characterize the invention are set forth in the appended claims.

Figure 1:
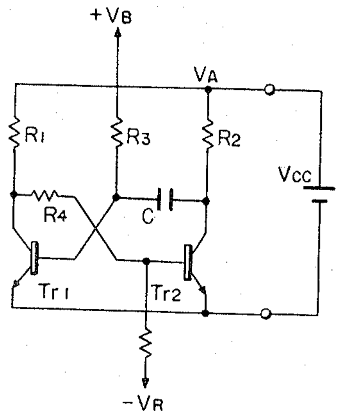
FIG. 1 is a circuit diagram of a conventional monostable multivibrator.

FIG. 1 of the accompanying drawing illustrates a typical conventional monostable multivibrator employing transistors which are connected such that the base current of a transistor Trl flows through a resistor R3 whereas the collector current of a transistor Tr2 flows through resistors R1 and R2. As is well known in the art the self-running period of this circuit (the period in which the transistor Trl is in the off state) is given by the following equation (1)

$$T1=R3\times CIn\frac{\left[\begin{array}{r}V_A+V_B-V_{EB,}(ON)-V_{CE2}(ON)\\ -IC_2(OFF)\times R_2\end{array}\right]}{V_B-V_{EB1}(ON)} \quad (1)$$

where Vrepresents the source voltage applied to the collector electrodes of transistors Trl and Tr2 respectively through resistors R1 and R2, $V_B$ the source voltage applied to the base electrode of the transistor Trl through the resistor $R_3$. $V_{CE2}(ON)$ a voltage between emitter and collector electrodes of transistor $T_{r2}$ when it is conductive, $V_{EB1}(ON)$ a voltage between emitter and base electrodes of the transistor $T_{r1}$ when it is conductive, and $I_{C2}(OFF)$ the collector current of the transistor $T_{r2}$ when it is nonconductive.

Variation in the self-running period caused by the variation in the ambient temperature will now be considered under the assumption that source voltages $V_A$ and $V_B$ in equation (1) are constant. First the logarithmic term in equation (1) is assumed to be constant. Then the logarithmic term will be represented by equation (2)

$$\frac{V_A+V_B-V_{EB1}(ON)-V_{CE2}(ON)-I_{C2}(OFF)\times R_2}{V_B-V_{EB}(ON)}=K\ (\text{constant}) \quad (2)$$

By solving equation (2) with respect to $V_b$, we obtain $$V_B=\frac{V_A}{K-1}+V_{EB1}(ON)-\frac{V_{CE2}(ON)+I_{C2}(OFF)}{K-1} \quad (3)$$

Generally the multivibrator is operated by assuming that K=2, so that by substituting in equation (3) a set valve of K=2 we obtain $V_B=V_A+V_{EB1}(ON)-V_{CE2}(ON)-I_{C2}(OFF)\times K_2=V_A+V_1$ where $V_1=V_{EB1}(ON)-V_{CE2}(ON)-_{C2}(OFF)\times R_2$ Accordingly in order to compensate for variations in $V_{EB1}(ON)$, $V_{CE2}(ON)$ and $I_{C2}(OFF)$ caused by the variation in ambient temperatures it is sufficient to select values of $V_B$ and $V_A$ that can satisfy equation (4). It will be clearly noted that the logarithmic term is made constant by such selection.

Next the term R3×C in equation (1) will be considered. The temperature coefficient of R3×C is given by the sum of the respective temperature coefficients of resistor R3 and condenser C and the temperature variation component of R3×C can be compensated for by maintaining voltages $V_B$ and $V_A$ in the logarithmic term at a definite relation. Thus, by setting the relation between voltages $V_B$ and $V_A$ to the relation of $V_B=V_A+V_O$ (5)

and then by varying $V_O$, it is able to compensate for the temperature variation component of R3×C. $V_O$ in equation (5) is set to a value represented by the following equation (6)

$V_O=V_1+V_2$ (6)

where $V_2$ represents a voltage adapted to compensate for the temperature variation component of C×R3. Thus it will be clearly noted that the variable component of the logarithmic term as well as the variable component of R3×C in equation (1) caused by the variation in the ambient temperature can be compensated for by applying a voltage $V_B=V_A+V_O$ to the base electrode of transistor $T_{rl}$ in FIG. 1 and by causing $V_O$ to vary in response to temperature variation.

As a means for causing $V_O$ to vary in response to temperature variation, compensation circuits including a temperature sensitive element 1 such as a thermistor or posistor as inbodiment of a monostable multivibrator employing such a compensation circuit. In the embodiment shown in FIG. 2 a thermistor Th is employed as the temperature sensitive element. As is obvious to those skilled in the art a thermistor or a posistor is to be selected as the temperature sensitive element dependent upon whether the temperature coefficient of the compensation voltage $V_0$ is positive or negative.

Figure 2:
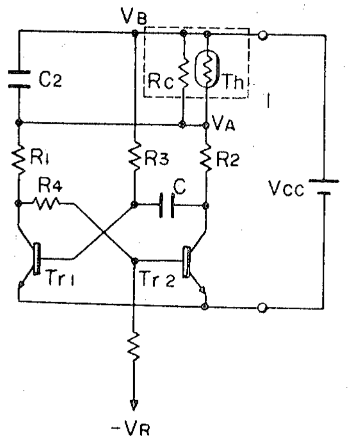
FIG. 2 is a circuit diagram of one example of a monostable multivibrator embodying this invention and utilizing a temperature sensitive element.
Figure 3:
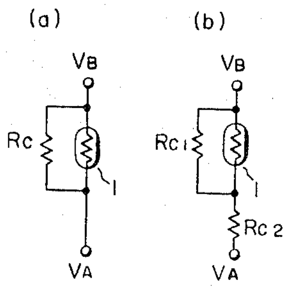
FIG. 3 shows diagrams to explain the temperature sensitive element to be employed in this invention.
Figure 4:
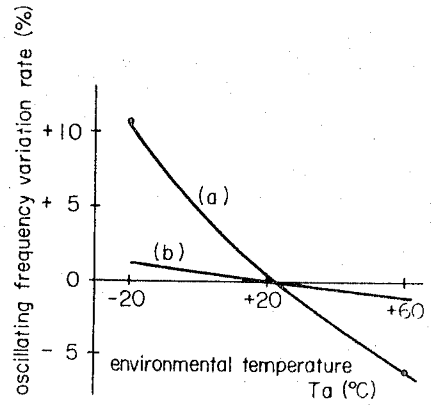
FIG. 4 is a graph to compare the oscillating frequency variation ratio (percent) of a conventional monostable multivibrator and a novel monostable multivibrator.

FIG. 4 shows the result of experiment made on the monostable multivibrator shown in FIG. 2 wherein a temperature sensitive element is used to compensate for the variation in the self-running period. Fig. 4 shows that, where the source voltage $V_{cc}$=3.0 volts and the ambient temperature ranged from −20° to +60° C. the oscillating frequency variation of the conventional monostable multivibrator shown in FIG. 1 was 15 percent as shown by a curve *a* whereas that of the novel monostable multivibrator as shown in FIG. 2 was only 2 percent as shown by a curve *b*.

Figure 5:
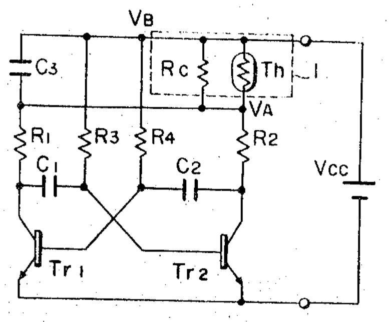
FIG. 5 shows a connection diagram of one example of an astable multivibrator embodying this invention.

FIG. 5 illustrates a blocking oscillator embodying this invention and utilizing a temperature sensitive element 1. As is well known the self-running period of a well-known blocking oscillator not embodying this invention is shown by $$T=(C_1+R_3+C_2\times R_4)\ln\frac{\left[\begin{array}{r}V_A+V_B-V_{EB1}(ON)-V_{CE1}(ON)\\ -I_{C2}(OFF)\times R_2\end{array}\right]}{V_B-V_{EB1}(ON)} \qquad (7)$$

Accordingly the compensating function of the oscillator shown in FIG. 5 for the variation in the ambient temperature afforded by the temperature sensitive element 1 is the same as that of the case of said monostable multivibrator.

Figure 6:
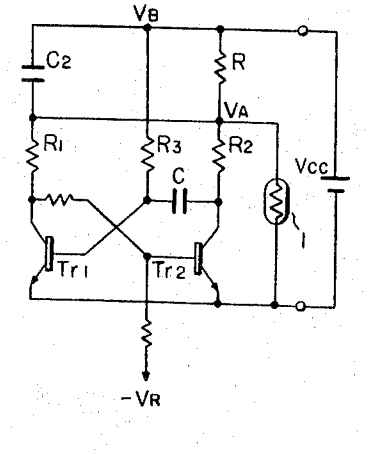
FIG. 6 shows a connection diagram of a modified monostable multivibrator of this invention.
Figure 7:
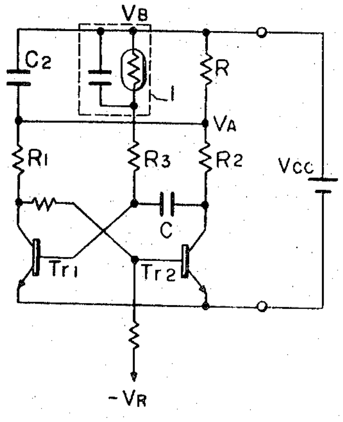
FIG. 7 shows a connection diagram of a modified monostable multivibrator.

Further, to attain the same object, according to this invention the temperature sensitive element 1 may be connected in parallel with a series circuit comprising a collector resistor R2 and the transistor $T_{rw}$, as shown in FIG. 6 or in series with the base resistor R3, as shown in FIG. 7.

Figure 9:
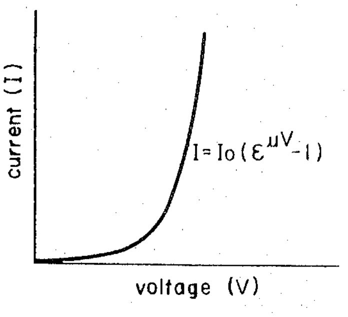
FIG. 9 shows a graph to show current viz, emitter-collector voltage characteristic of the transistor.

A novel temperature and voltage compensated pulse generating circuit according to this invention which is not affected by the variations in the supply voltage and ambient temperature will now be described hereunder. In said equation (1) which generally represents the self-running period of the circuit shown in FIG. 1, the variation in the self-running period caused by the variation in the source voltage will first be analyzed by assuming that the ambient temperature is constant. In the logarithmic term of equation (1) when voltages $V_A$ and $V_B$ vary, values of $V_{EB1}$(ON), $V_{CE2}$(ON) and $I_{C2}$(OFF) do not vary linearly. $I_{C2}$(OFF)×R2 becomes a constant voltage and voltages $V_{EB1}$(ON) and $V_{CE2}$(ON) manifest an exponential current-voltage characteristic as shown in FIG. 9 with respect to the base current of transistor $T_{r1}$ and to the collector current of transistor $T_{r2}$. As a consequence the logarithmic term of equation (1) would not become constant for varying voltages $V_A$ and $V_B$ even if voltages $V_A$ and $V_B$ vary proportionally. For this reason the self-running period $T_1$ would vary. In order to make constant the self-running period $T_1$, voltages $V_A$ and $V_B$ must satisfy following equations (8) and (9).

$V_BB=V_A+V_{EB1}(ON)-_{CE2}(ON)-I_{C2}(OFF)\times R2$ (8)

$\Delta V_BV_B=\Delta V_A+\Delta V_{EB1}(ON)-\Delta V_{CE2}(ON)$ (9)

In equation (9) symbol Δ represents increments of varying voltages $V_A$ and $V_B$.

By substituting equation (8) in equation (1) we obtain the following equation representing the self-running period $T_1$ $I_11=R3\times C_{n2}$ (10)

Figure 8:
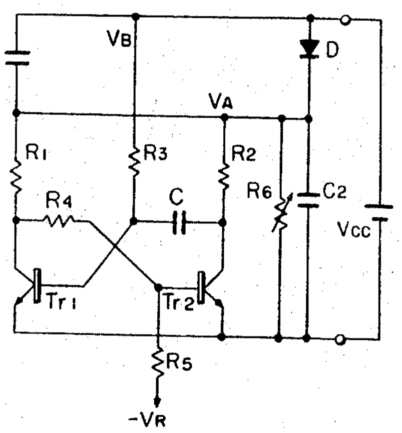
FIG. 8 shows a connection diagram of a monostable multivibrator utilizing a diode.

This equation means that the self-running period $T_1$ is independent of voltages $V_A$ and $V_B$. A circuit that satisfies equations (8) and (9) is a circuit wherein a diode D is connected in series with collector resistors R1 and R2 of transistors $T_{r1}$ and $T_{r2}$ as shown in FIG. 8. In this figure if it is assumed that Vcc represents the source voltage and $V_F$ represents the forward voltage of the diode D, then we obtain $Vcc=V_B=V_F$ (11)

As is well known in the art the forward characteristic of the forward voltage $V_F$ of diode D is an exponential current-voltage characteristic just like said voltage $V_{EB1}$(ON).

Thus by selecting a forward voltage $V_F$ which satisfies following equations (12) and (13) as the forward voltage of diode D it becomes possible to satisfy above described equations (7) and (8) so that equation (1) becomes equation (10) thus providing an extremely stable self-running period independent of the variation in the source voltage $V_F=V_{EB1}(ON)-V_{CE2}(ON)-I_{C2}(OFF)\times r2$ (12)

$\Delta V_F=V_{EB1}(ON)-\Delta V_{CE2}(ON)$ (13)

Figure 10:
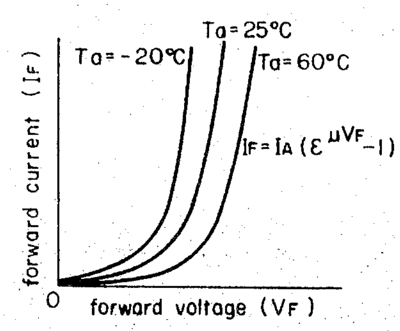
FIG. 10 shows forward current characteristics of a diode at various ambient temperatures.

The voltage $V_F$ that can satisfy equation (11) can be provided by adjusting a resistor R6 shown in FIG. 8 so as to control the forward current of diode D shown in FIG. 10. Where several stages of monostable multivibrators are used it is possible to obtain a voltage $V_F$ that satisfies equation (12) by adjusting the forward current of diode D by means of the collector current and the like of monostable multivibrators other than that shown in FIG. 8. Condenser $C_2$ shown in FIG. 8 is a smoothing condenser.

Variation in the self-oscillating oscillating frequency caused by the variation in the ambient temperature will now be analyzed by assuming that voltages $V_A$ and $V_B$ in equation (1) are constant. In equation (1) the variation of the product R3×C caused by the variation in the ambient temperature can be made extremely small by the proper selection of respective temperature coefficients. As a consequence, when considering the logarithm of equation (1), even when voltages $V_A$ and $V_B$ are assumed constant, since $V_{EB1}$(ON), $V_{CE2}$(ON) and $I_{C2}$(OFF)×R2 vary, the logarithmic term also varies. Where the voltage $V_B$ is maintained constant, it is able to make constant the self-running period by satisfying the following equation.

$\Delta V_A=\Delta V_{EB1}(ON)-\Delta V_{CE2}(ON)-\Delta I_{C2}(OFF)\times CR2$ (13)

In equation (13) symbol Δ represents respective increments caused by the variation in the ambient temperature. Since the voltage $\Delta V_A$ in equation (13) coincides with the current-voltage characteristics of diode D shown in FIG. 10 which are plotted by taking the ambient temperature *Ta* as the parameter, it becomes possible to satisfy the following equation (14) by utilizing the variation $\Delta V_F$ of the forward voltage $V_F$ of diode D caused by the variation in the ambient temperature.

$\Delta V_F=\Delta V_{EB1}(ON)-\Delta V_{CE2}(ON)-\Delta I_{C2}(OFF)\times CR2$ (14)

Consequently equation (1) becomes independent of the ambient temperature whereby an extremely stable self-oscillating period can be provided.

Figure 11:
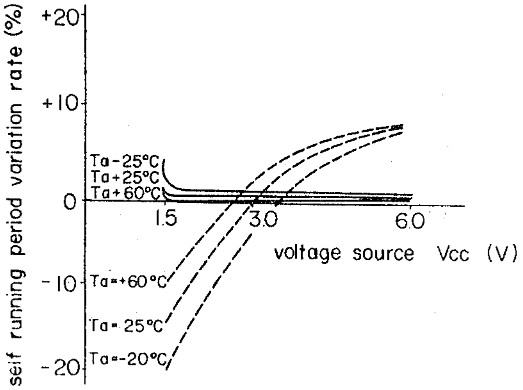
FIG. 11 shows the operation of the circuit shown in FIG. 8.

As has been described in the foregoing, it is possible to maintain the self-running period at an extremely stable state irrespective of variations in source voltage and ambient temperature by utilizing the forward voltage of diode D connected in series with collector resistors R1 and R2 as shown in FIG. 8. One example of the operation of the circuit shown in FIG. 8 is plotted in FIG. 11 which shows a set of source voltage (Vcc) viz self-running period variation ratio (in percent) characteristics by taking ambient temperatures of −20°, +25° and +60° C. as the parameter. Within a range of source voltage of from 1.5 v. to 6.0 v., the self-running period variation ratio was about 30 percent without no compensation (not employing this invention) but this ratio was decreased to about 2 percent with compensation (employing this invention). In FIG. 11 dotted line curves show characteristic curves without compensation whereas solid line curves those compensated in accordance with this invention.

Figure 12:
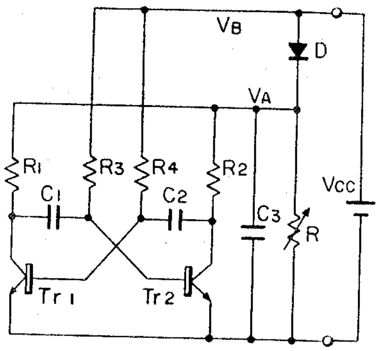
Figure 13:
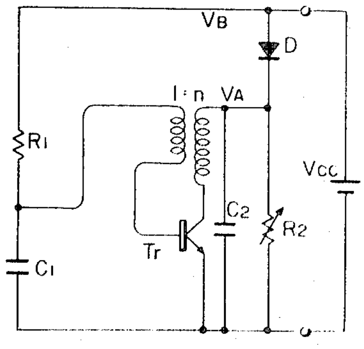
FIG. 13 is a connection diagram of a blocking oscillator and FIG. 14 shows a monostable multivibrator utilizing both a temperature sensitive element and a diode.

FIGS. 12 and 13 show circuits of an astable multivibrator and of a blocking oscillator, respectively, constructed according to this invention. The self-running period of the astable multivibrator is expressed by said equation (7). Thus, in order to make stable this self-running period, a diode D is connected as shown in FIG. 12 in quite the same manner as in the case of the monostable multivibrator shown in FIG. 8.

The operation of the blocking oscillator of this invention shown in FIG. 13 is as follows: In a well-known blocking oscillator not employing this invention, when the turns ratio of a transformer is selected 1: *n* the self-running period T of this oscillator can be shown by the following equation (15) as is well understood by those skilled in the art.

$$T_r = C \times R1 \ln \frac{\frac{1}{n}V_A + V_B - V_{EB}(ON) - \frac{1}{n}V_{CE}(ON)}{V_B - V_{EB}(ON)} \quad (15)$$

Accordingly, if following equations (16) and (18) were satisfied, the self-running period $T_r$ shown by equation (15) would become quite stable.

$$V_B = V_A + V_{EB}(ON) - V_{CE}(ON) \quad (16)$$

$$\Delta V_B = \Delta V_A + \Delta V_{EB}(ON) - \Delta V_{CE}(ON) \quad (17)$$

Since equations (16) and (17) coincide with above described equations (7) and (8) respectively, it will be obvious that the same compensation function is provided for the circuit shown in FIG. 13.

Figure 14:
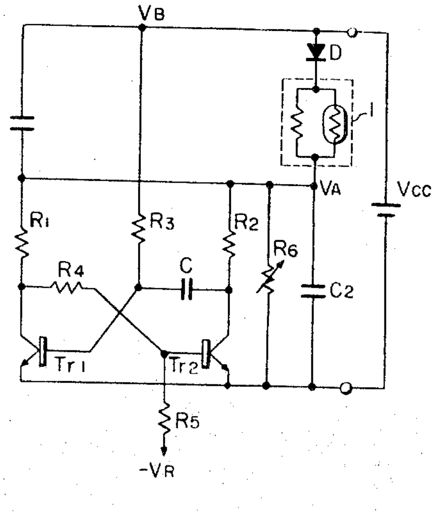

FIG. 14 shows a modified monostable multivibrator according to this invention wherein the self-running period is made more stable by utilizing both a temperature sensitive element and a diode. Since the circuit of this embodiment corresponds to the combination of previous embodiments, it is believed unnecessary to describe its operation. It is of course to be understood that both a temperature sensitive element and a diode can be used in monostable multivibrators and blocking oscillators with equivalent results.

While in the above embodiments diodes were used as the compensating element it should be understood that the invention is not limited to such particular elements but any element having a similar exponential current-voltage characteristic, such as thermistor, may be used.

It should be obvious that many alterations and modification may be made to the described embodiments without departing from the spirit and scope of the invention as defined in the appended claims.

What is claimed is:

1. In a blocking oscillator compensated for the variation in the source voltage and/or ambient temperature comprising:
   - a transistor;
   - a primary winding connected to the base electrode of said transistor;
   - a secondary winding electrically coupled with said primary winding and connected to the collector electrode of said transistor; and
   - a power source;

the improvement comprising:
   - a diode having exponential current-voltage characteristic and connected in the forward direction between said source and said secondary winding, said diode, power source and secondary winding forming a series circuit, said diode providing said compensation.

* * * * *